US 6,690,532 B1

(12) United States Patent
Choo et al.

(10) Patent No.: US 6,690,532 B1
(45) Date of Patent: Feb. 10, 2004

(54) SELF-DIAGNOSTIC MR HEAD RECOVERY

(75) Inventors: Swee Kieong Choo, Singapore (SG);
Jack Ming Teng, Singapore (SG);
Hwee Peng Teo, Singapore (SG);
Myint Ngwe, Singapore (SG); Beng Wee Quak, Singapore (SG); Kwee Teck Say, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/539,796

(22) Filed: Mar. 31, 2000

Related U.S. Application Data

(60) Provisional application No. 60/145,497, filed on Jul. 23, 1999.

(51) Int. Cl.$^7$ .............................................. G11B 21/02
(52) U.S. Cl. ........................................................ 360/75
(58) Field of Search .................................. 360/75, 66

(56) References Cited

U.S. PATENT DOCUMENTS

| | | | |
|---|---|---|---|
| 5,309,295 A | * | 5/1994 | Bailey et al. ................. 360/66 |
| 5,379,162 A | | 1/1995 | Cunningham et al. ........ 360/53 |
| 5,490,149 A | | 2/1996 | Nylander-Hill ......... 395/182.03 |
| 5,600,500 A | | 2/1997 | Madsen et al. ................ 360/46 |
| 5,673,159 A | * | 9/1997 | Jinbo et al. ............... 360/98.01 |
| 5,812,752 A | | 9/1998 | Yamada .................. 395/182.03 |
| 5,918,001 A | | 6/1999 | Ueno et al. ............. 395/182.06 |
| 5,940,234 A | | 8/1999 | Wilson et al. ................. 360/53 |

* cited by examiner

Primary Examiner—David Hudspeth
Assistant Examiner—Mitchell Slavitt
(74) Attorney, Agent, or Firm—Mitchell K. McCarthy

(57) ABSTRACT

A method and apparatus for detecting and recovering from head instability in a magneto-resistive (MR) transducer head of a disc-drive system. A head-instability-recovery circuit is described for use in disc drive to recover from a head-instability condition of an MR transducer head. This circuit includes a controller and a current source that supplies current to the MR head. The current source is controlled to supply a nominal amount of current to the MR head when operating in a normal mode, and to supply one or more current bursts having a current above the nominal supply current in order to recover from the head-instability condition. Also described is a method for recovering from a transducer-instability condition of an MR transducer of a disc drive, including detecting a situation that indicates a head-instability-recovery operation is desired, and performing the head-instability-recovery operation.

20 Claims, 4 Drawing Sheets

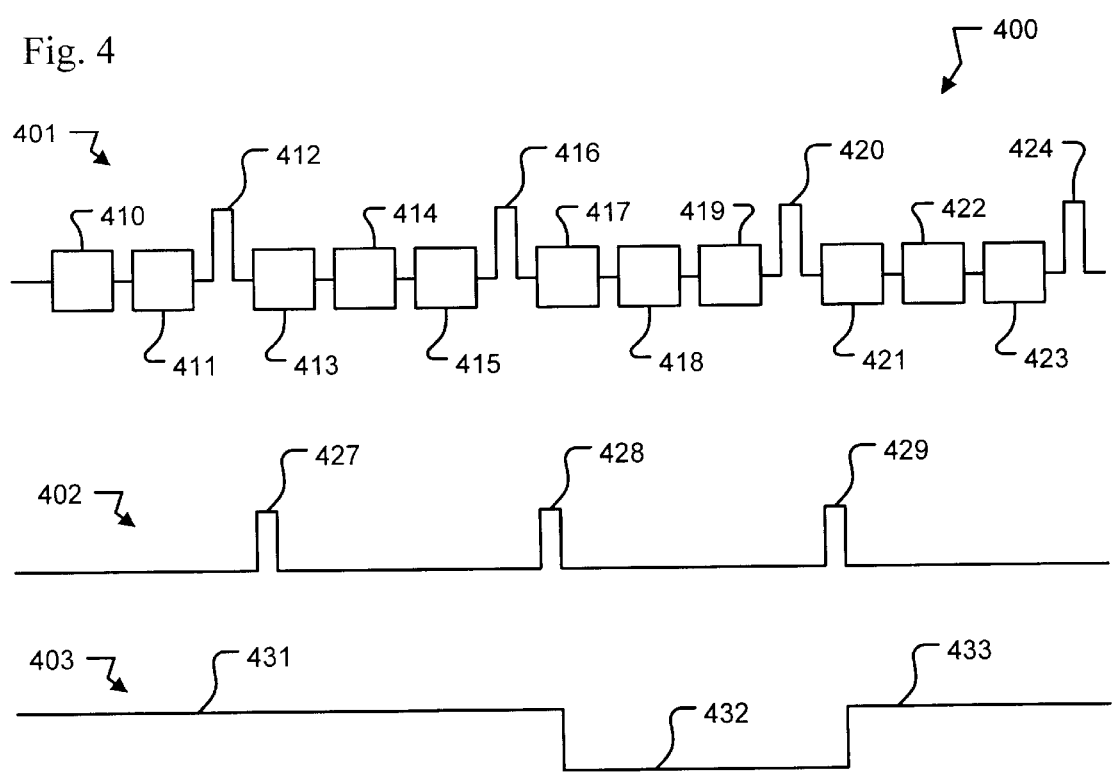

SELF-DIAGNOSTIC MR HEAD RECOVERY

RELATED APPLICATIONS

This application claims the benefit under 35 U.S.C. 119(e) of U.S. Provisional Application Serial No. 60/145,497 filed Jul. 23, 1999.

FIELD OF THE INVENTION

The present invention relates to the field of mass-storage devices. More particularly, this invention relates to a method and apparatus for detecting and recovering from head instability in a magneto-resistive (MR) transducer head.

BACKGROUND OF THE INVENTION

Devices that store data are key components of any computer system. Computer systems have many different types of devices where data can be stored. One common device for storing massive amounts of computer data is a disc drive. The basic parts of a disc drive are a disc assembly having at least one disc that is rotated, an actuator that moves a transducer to various locations over the rotating disc, circuitry that is used to write and/or read data to and from the disc via the transducer, and a bus interface to connect the disc drive into an information-handling system. The disc drive also includes circuitry for encoding data so that it can be successfully retrieved from and written to the disc surface. A microprocessor controls most of the operations of the disc drive, in addition to passing the data back to the requesting computer and receiving data from a requesting computer for storing to the disc.

The disc drive includes a transducer head for writing data onto circular or spiral tracks in a magnetic layer the disc surfaces and for reading the data from the magnetic layer. In some drives, the transducer includes an electrically driven coil or "write head") that provides a magnetic field for writing data, and a magneto-resistive (MR) element (or "read head") that detects changes in the magnetic field along the tracks for reading data. Some MR elements include giant magneto-resistive (GMR) technology.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc-drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. In some disc drives, the tracks are a multiplicity of concentric circular tracks. In other disc drives, a continuous spiral is one track on one side of a disc drive. Servo feedback information written on the disc(s) is used to accurately locate the transducer.

The transducer is also said to be moved to a "target track." Once the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track in an operation called a "seek." A seek is movement of an actuator assembly from a first track to a second target track. Acoustic emissions are more prevalent during rapid disc seek operations. To perform a seek, the actuator assembly is moved to the required position and held very accurately during a read or write operation using the servo information.

Nevertheless, each of these improvements have proved marginal, and some have been prohibitively costly. There is a need for a method and apparatus to substantially reduce unwanted acoustic emissions from the disc drive due to the actuator seeks and disc rotation. There is also a need for a method and apparatus to reduce the amount of vibration and shock absorbed into the disc drive from the external environment. There is also a need for an inexpensive method and apparatus.

SUMMARY OF THE INVENTION

A method and apparatus is described for recovering from a head-instability condition of a magneto-resistive (MR) transducer head.

One aspect of the present invention provides a disc drive. This disc drive includes a disc case, a disc rotatably mounted within the disc case, and an actuator assembly mounted within the disc case, the actuator assembly having a magneto-resistive (MR) transducer head. The disc drive also includes a controller and a current source. The current source supplies current to the MR head and is operatively coupled to be controlled by the controller to supply a nominal amount of current to the MR head when operating the MR head in a normal mode, and to supply one or more recovery current bursts having a current value above the nominal supply current in order to recover from a head-instability condition.

Another aspect of the present invention provides a head-instability-recovery circuit for use in disc drive to recover from a head-instability condition of a magneto-resistive (MR) transducer head. This circuit includes a controller and a current source that supplies current to the MR head. The current source is operatively coupled to be controlled by the controller to supply a nominal amount of current to the MR head when operating the MR head in a normal mode, and to supply one or more current bursts having a current above the nominal supply current in order to recover from the head-instability condition.

Yet another aspect of the present invention provides a method for recovering from a transducer-instability condition of a magneto-resistive (MR) transducer of a disc drive.

This method includes (a) detecting a situation that indicates a head-instability-recovery operation is desired, and (b) performing the head-instability-recovery operation.

Still another aspect of the present invention provides a disc drive system that includes a base plate, a rotatable disc mounted to the base plate, an actuator, the actuator including a magneto-resistive (MR) transducer mounted to the actuator in transducing relation to the disc, and means as described herein, operably coupled to the MR transducer, for recovering from instability of the MR transducer.

BRIEF DESCRIPTION OF THE DRAWINGS

FIG. 4 is a timing chart of an MR head-instability-recovery method.

DESCRIPTION OF THE PREFERRED EMBODIMENT

In the following detailed description of the preferred embodiments, reference is made to the accompanying drawings which form a part hereof, and in which are shown, by way of illustration, specific embodiments in which the invention may be practiced. It is to be understood that other embodiments may be utilized and structural changes may be made without departing from the scope of the present invention.

The invention described in this application is useful for all types of disc drives, including hard-disc drives, ZIP drives, floppy-disc drives, and any other type of drives, systems of drives (such as a "redundant array of inexpensive/independent disc drives," or RAID, configuration) or other devices, where an MR or GMR transducer head is used.

Figure 1:
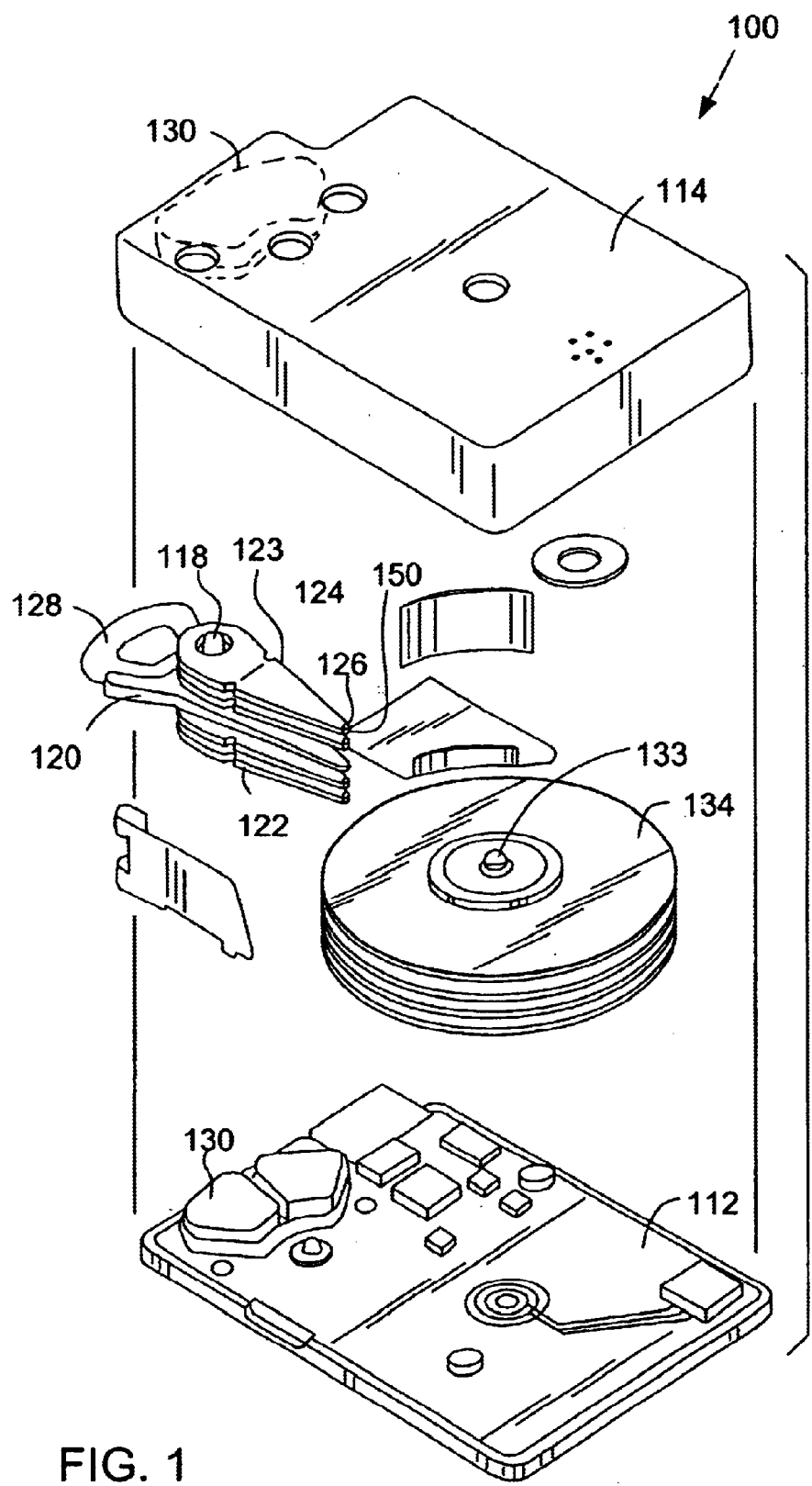
FIG. 1 is an exploded view of a disc drive with a multiple disc stack.

The invention described in this application is useful with many electrical and mechanical configurations of disc drives having either rotary or linear actuation. In addition, the invention is also useful in all types of disc drives including hard disc drives, zip drives, floppy disc drives and any other type of drives where providing a low-noise current source for the transducer may be desirable. FIG. 1 is an exploded view of one embodiment of the present invention, this embodiment showing one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. In some embodiments, transducer 150 includes a thin-film electromagnetic coil write head 220/221 and a magneto-resistive read head 210 (see FIG. 2). The slider 126 with the transducer 150 form what is many times called the head. It should be noted that many sliders have one transducer 150 and that is what is shown in the figures. It should also be noted that this invention is equally applicable to sliders only an MR or magneto resistive head 210. On the end of the actuator assembly 120 opposite the load springs 124 and the sliders 126 is a voice coil 128.

Attached within the base 112 is a first magnet 130 and a second magnet 130 associated with the cover 114. The first and second magnets 130, and the voice coil 128 are the key components of a voice coil motor which applies a force to the actuator assembly 120 to rotate it about the actuator shaft 118. Also mounted to the base 112 is a spindle motor. The spindle motor includes a rotating portion called spindle hub 133. In this particular disc drive, the spindle motor is within hub 133. In FIG. 1, a number of discs 134 (one or more; four are shown) are attached to the spindle hub 133 to form disc assembly 132. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
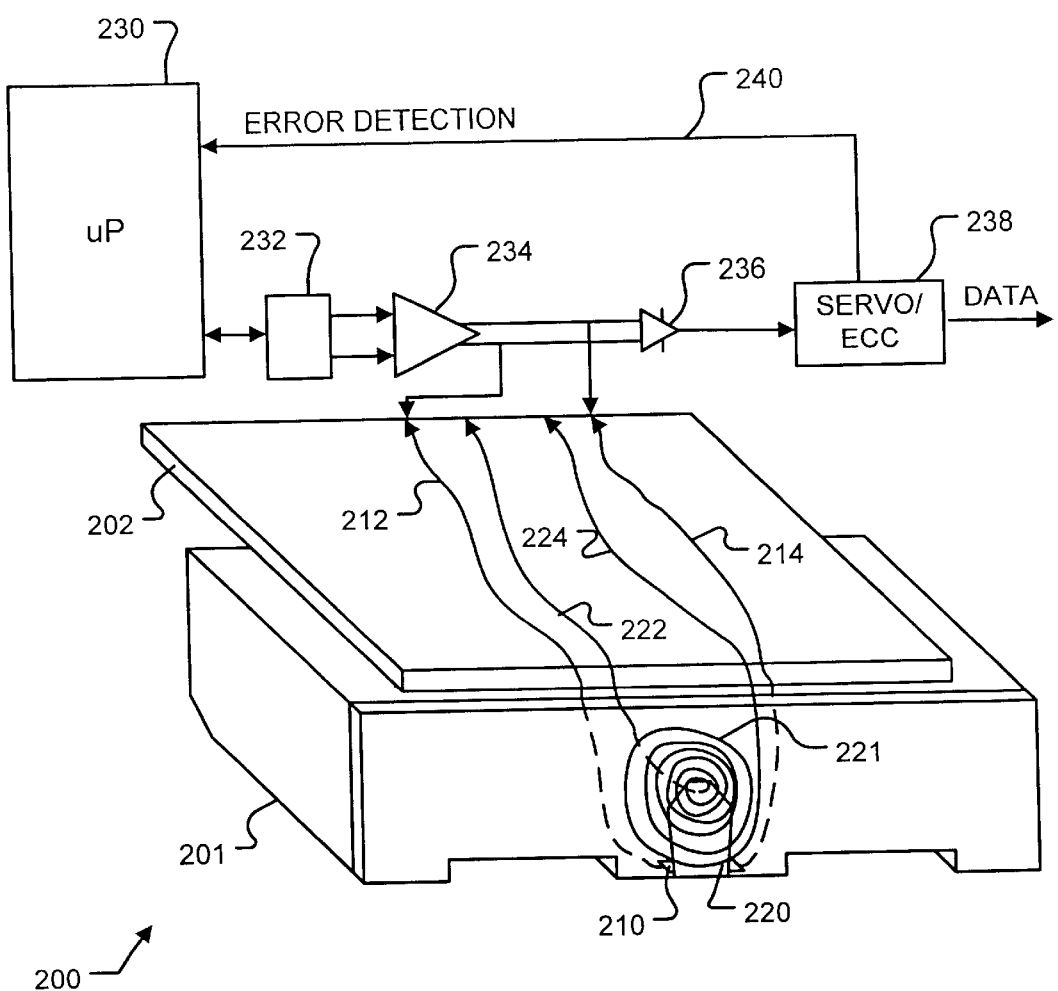
FIG. 2 is a diagrammatic view of an actuator assembly having an MR head.
Figure 3:
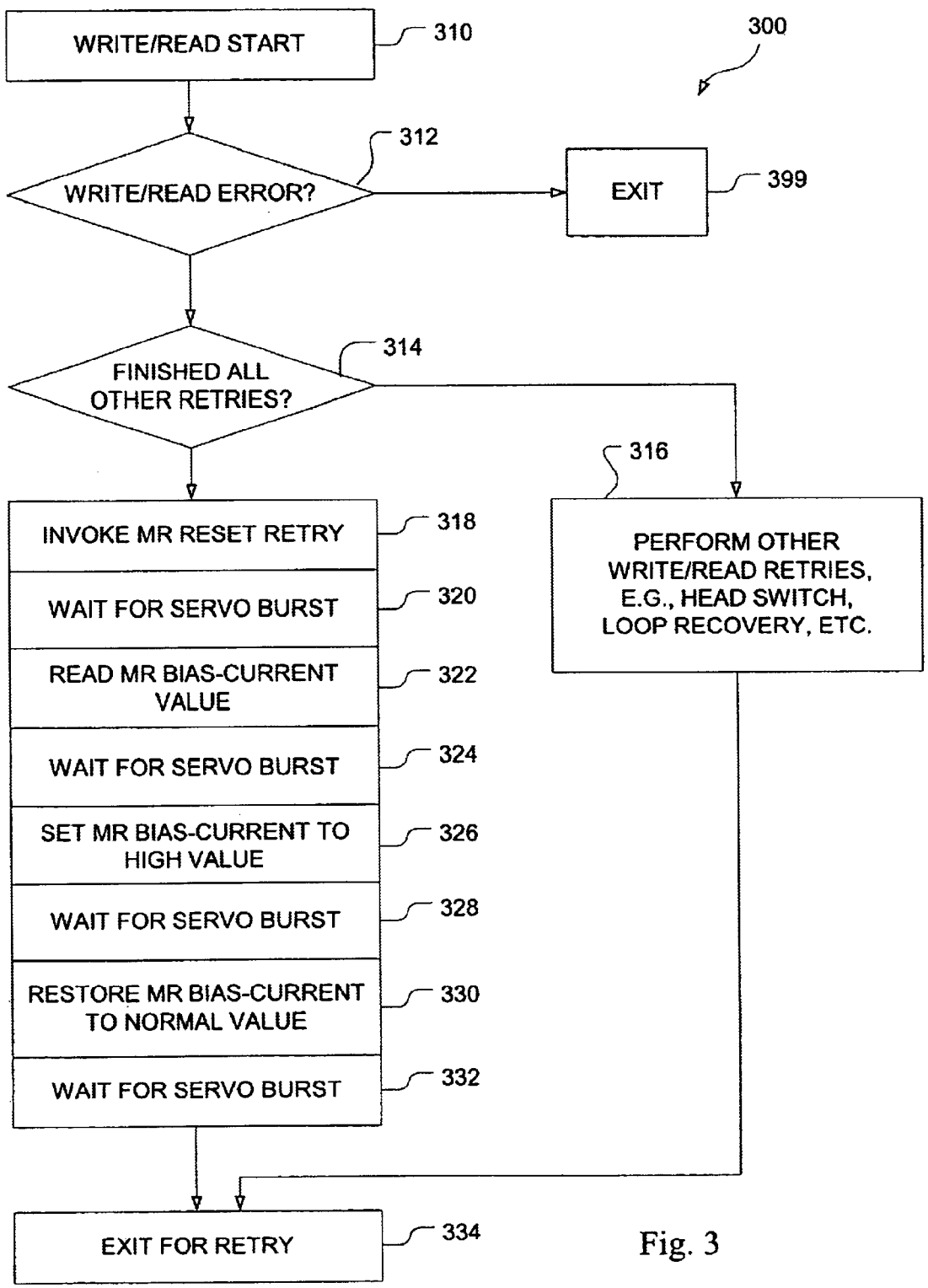
FIG. 3 is a flowchart of an MR head-instability-recovery method.

FIG. 2 is a diagrammatic view of a portion of actuator assembly 200 having an MR head 210. Air-bearing slider 201 is attached to the end of arm 202 (typically using a gimble, not shown). At the trailing edge of slider 201 is a thin-film write head 220 having thin-film coil 221 that is electrically coupled to write-channel electronics (not shown) via wires 222 and 224. MR read head 210 is typically located with a face on the lower surface of slider 201, in front of write head 220, and typically separated from write head 220 by shielding (not shown). Each MR read head 210 is electrically coupled to read-channel electronics 236 via wires 212 and 214, which also connect to bias current source 234. Detection circuit 238, connected to read-channel electronics 236 detects whether an error was detected in the servo-read signal or the error-correction circuitry of read-channel electronics 236, and provides error-detection signal 240 to microprocessor 230. If microprocessor 230 then determines that a retry is required, the method of FIG. 3 is used. For example, some errors can be corrected simply using the (redundant) ECC information that is written with the data when the data is written onto the disc, as is well known in the magnetic disc-drive art. Other errors can be corrected by waiting a revolution of the disc, and then retrying the read operation. Thus, in some embodiments, microprocessor 230 is a data-recovery circuit that acts to control one or more various retry operations, including providing increased current to the MR head according to the present invention. In other embodiments, a separate data recovery circuit (i.e., other than controller 230) is used. Thus, finally, after other attempts have failed to correct the error, an error caused by head-instability can be corrected using the method of FIG. 3.

The magnitude of the bias current provided by bias current source 234 is specified by a value stored in bias-current register 232 by microprocessor 230. In some embodiments, a separate value is specified for each one of the plurality of MR read heads 210 within a single disc drive 100, such that each MR read head 210 is provided with a "nominal" bias current optimized for its own characteristics in order to obtain the best read-data signal from each head. In other embodiments, a single nominal value is specified for use by all of the plurality of MR read heads 210 within a single disc drive 100.

According to one aspect of the present invention, if a head instability problem is detected for a particular MR read head 210, microprocessor 230 will read the nominal value from the bias-current register 232 for that head, and write back a value that more current to be supplied to that head for a short period of time. This pulse of increased current will correct the instability problem. At the end of the period of time, microprocessor 230 will store the nominal value to the bias-current register 232 for that head, thus restoring the normal read current to that head.

FIG. 3 is a flowchart of an MR head-instability-recovery method used by one embodiment of the invention. Block 310 represents a read operation that reads back data that was earlier written to a particular sector. At block 312, a test is performed to determine whether an error has been detected, and if no error was found, the path to exit block 399 is taken. If an error was detected, block 314 will test to determine whether all other retries (other than the MR increased current pulse) have been performed, and if not, the path to block 316 is taken, and at block 316 the other retries are attempted, for example head switches (switching to another head and back), loop retries (taking another revolution to re-read the sector that gave an error), etc. After the retries of block 316, the path to exit-for-retry block 334 is taken. If the test at block 314 determines that all other retries have been attempted, the path to blocks 318–332 is taken. In this embodiment, block 318 starts the MR instability-reset retry operation. At block 320, the drive waits for the next servo burst, and at block 322, the drive reads the value from register 232 that provides the nominal MR bias current for this head (the head 210 for which the error was detected). At block 324, the drive waits for the next servo burst, and at block 326, the drive writes the value to register 232 that provides the increased MR bias current (e.g., nominal current plus 3 mA) for this head (the head 210 for which the error was detected). This increased current is maintained for an amount of time necessary to eliminate the head instability, which, in this embodiment, is the time from the end of one servo burst to the end of the next servo burst, which is approximately 100 to 150 microseconds. At block 328, the drive waits for the next servo burst, and at block 330, the drive write the value to register 232 that provides the nominal MR bias current for this head (the head 210 for which the error was detected). At block 332, the drive waits for the next servo burst to ensure that the head is back to nominal current before attempting to retry the read operation. The path to exit-for-retry block 334 is then taken, and the read operation is retried (generally back to block 310).

FIG. 4 is a timing chart 400 of an MR head-instability-recovery method of one embodiment. Timing paths 401, 402 and 403 occur simultaneously across the same period of time. Path 401 represents a data read 410, data read 411, sector burst 412, data read 413, data read 414, data read 415, sector burst 416, data read 417, data read 418, data read 419, sector burst 420, data read 421, data read 422, data read 423, and sector burst 424. The data read operations can be single sectors, partial sectors, or multiple sectors. An error is detected, for example during the data read 411. As describe above (block 316), all other retries have been attempted previously. Thus block 320 waits for servo burst 412, and microprocessor 230 reads register 232 at time 427 (block 322). Block 324 waits for servo burst 428, and microprocessor 230 writes register 232 at time 428 (block 326). This causes the current to the MR head (signal 403) to change from its nominal level 431 to an increased level 432 (shown here in negative logic, or more negative) from time 428 to time 429. Block 328 waits for servo burst 429, and microprocessor 230 writes register 232 at time 429 (block 330). Block 332 waits for servo burst 424, and microprocessor 230 then retries the read operation to the affected area on the following revolution of disc 134.

When using a magneto-resistive (MR) transducer, "head instability" is a phenomenon whereby the MR head domain goes into an instability state. When head instability occurs, the drive is unable to perform any write/read function. The present invention provides an efficient resolution for this problem, vis., an MR-head-instability-recovery algorithm to overcome the write/read problem in hard disc drives. The MR-head-instability-recovery algorithm can be applied at start up as a preventative measure (e.g., applied to every head), or at other times after an error has been detected as a recovery measure (e.g., applied only to the head for which an error was detected), or at both situations.

When an MR head is operated to read data from the disc, a bias current is applied to the head, and changes in the magnetic field detected from the disc surface results in voltage changes across the head. Typically a constant current value, termed the "nominal current" in this description, is used that optimizes sensitivity and noise characteristics of the read operations.

In some embodiments of the present invention, when a head instability is detected or suspected, a short pulse of MR bias current, usually about 3 milliamps (mA) higher than its nominal current, is injected into the selected head through the preamplifier. This high current is maintained in the head for a short period of time, 100 µs, before the current is restored to its nominal value. Experiments have shown that a value of about 100 microseconds (µs) is sufficient to overcome the head instability problem for some embodiments. In some embodiments, this timing is approximately equivalent to a servo wedge time in the disc drive that is spinning at 5400 rpm with 96 servo wedges per revolution. In some embodiments, this servo wedge time is used to determine how long the nominal +3 mA MR bias current would be applied to the MR head.

Servo wedge time=(1/(5 400 rpm)×60 seconds)/96=115 µs

The MR head instability recovery algorithm of one embodiment is implemented into two different retry operations of the hard disc drive. These are (a) the Spin-Up retries and (b) the Read/Write retries.

Since a head instability problem is not predictable in the hard disc drive, the MR head instability recovery algorithm, in some embodiments, is done only at the end of the retries when all the other read/write retries are exhausted. See the flowchart of FIG. 3.

When a sector is suspected to be affected by head instability (for example, if other error recovery operations are unable to obtain good data), the MR bias current is first read from the preamplifier, this is known as the nominal current. Next a calculated recovery bias current, equivalent to the nominal current plus an additional 3 mA, is sent to the preamplifier, which applies that current to the MR head. The firmware will wait for the next servo wedges to arrive before reprogramming the preamplifier with the nominal current.

The diagram of FIG. 4 shows the sequence for the reading and reprogramming of the bias current through the preamplifier.

Since head instability can happen at any location of the drive, some head instability failures will affect the servo signal, thereby causing the drive to have servo- and spindle-related problems being detected.

In some embodiments, when a drive is unable to spin up or encounters three consecutive bad samples, the MR bias current, known as the nominal current, is first read from the preamplifier. The calculated recovery current, nominal current plus 3 mA, is then sent to the preamplifier. The controller will be delayed for 150 µs before reprogramming the preamplifier with the nominal current.

The diagram of FIG. 4 also shows the schematic timing for SDEN (Serial Data Enable) of the preamplifier and MRBIAS of the controller.

The flowchart of FIG. 3 further illustrates the flow of the MR head instability recovery algorithm in the read/write retries.

With the implementation of the MR head instability recovery algorithm, the following advantages are achieved:
1. no rework of the defective head(s) is/are needed as the affected head(s) are recovered by a reset of the MR bias current resulting in the drives being functional again,
2. cost savings are expected as the affected head(s) will not need to be reworked and drives need not be disassembled; these unnecessary rework processes and overheads can be eliminated,
3. time taken to turn-around the drive is faster as the recovery algorithm is able to resolve head instability without the need to perform failure analysis, and
4. process and cumulative yields are increased as drives originally designated as failing for head instability will become functional, thereby resulting in more passed drives.

Conclusion

Described above is a method and apparatus for detecting and recovering from head instability in a magneto-resistive (MR) transducer head.

One aspect of the present invention provides a disc drive 100. Disc drive 100 includes a disc case 112/114, a disc 134 rotatably mounted within the disc case 112/114, and an actuator assembly 120 mounted within the disc case. The actuator assembly includes a magneto-resistive (MR) transducer head 210. The disc drive 100 also includes a controller 230 and a current source 234. The current source 234 supplies current to the MR head 210 and is operatively coupled to be controlled by the controller 230 to supply a nominal amount of current to the MR head 210 when operating the MR head in a normal mode, and to supply one or more recovery current bursts having a current value above the nominal supply current in order to recover from a head-instability condition.

In some embodiments of the disc drive 100, the current source 234 supplies one or more current bursts having a current that is about three milliamps above the nominal supply current of the MR head 210.

In some embodiments of the disc drive, the current source 234 supplies one or more current bursts having a duration of about one hundred microseconds each and a current that is above the nominal supply current of the MR head 210.

In some embodiments of the disc drive, the current source 234 supplies one or more current bursts having a duration of about one hundred microseconds each and a current that is about three milliamps above the nominal supply current of the MR head 210.

In some embodiments of the disc drive, the controller 230 controls the current source 234 to supply the recovery current bursts during a startup condition.

Some embodiments of the disc drive further include a detector 238 that detects whether an error has occurred during a data read operation, and a data-recovery circuit 230 that operates to attempt to correct the detected error, and thereafter indicates to the controller 230 to supply the recovery current bursts if at least one of the data-recovery circuit attempts fails to correct the detected error.

Another aspect of the present invention provides a head-instability-recovery circuit 200 for use in disc drive to recover from a head-instability condition of a magneto-resistive (MR) transducer head 210. Circuit 200 includes a controller 230 and a current source 234 that supplies current to the MR head 210. The current source 234 is controlled by the controller 230 to supply a nominal amount of current to the MR head when operating the MR head 210 in a normal mode, and to supply one or more current bursts having a current above the nominal supply current in order to recover from the head-instability condition.

In some embodiments of the head-instability-recovery circuit 200, the current source 234 supplies one or more current bursts having a current that is about three milliamps above the nominal supply current of the MR head 210.

In some embodiments of the head-instability-recovery circuit 200, the current source 234 supplies one or more current bursts having a duration of about one hundred microseconds each and a current that is above the nominal supply current of the MR head 210.

In some embodiments of the head-instability-recovery circuit 200, the current source 234 supplies one or more current bursts having a duration of about one hundred microseconds each and a current that is about three milliamps above the nominal supply current of the MR head 210.

In some embodiments of the head-instability-recovery circuit 200, the controller 230 controls the current source 234 to supply the recovery current bursts during a startup condition.

Some embodiments of the head-instability-recovery circuit 200 further include a detector 238 that detects whether an error has occurred during a data read operation, and a data-recovery circuit 230 that operates to attempt to correct the detected error, and thereafter indicates to the controller 230 to supply the recovery current bursts if at least one of the data-recovery circuit fails to correct the detected error.

Yet another aspect of the present invention provides a method 300 for recovering from a transducer-instability condition of a magneto-resistive (MR) transducer of a disc drive. This method includes (a) detecting a situation that indicates a head-instability-recovery operation is desired, and (b) performing the head-instability-recovery operation.

In some embodiments, performing the head-instability-recovery operation further includes supplying one or more current bursts having a current above a nominal supply current of the MR head 210.

In some embodiments, supplying one or more current bursts further includes supplying one or more current bursts having a current that is about 3 milliamps above the nominal supply current of the MR head. In some embodiments, supplying one or more current bursts further includes supplying one or more current bursts having a duration of about 100 microseconds each and a current that is above the nominal supply current of the MR head. In some embodiments, supplying one or more current bursts further includes both supplying one or more current bursts having a duration of about 100 microseconds each and a current that is about 3 milliamps above the nominal supply current of the MR head 210.

In some embodiments, the detecting a situation further includes detecting a startup condition.

In some embodiments, the (a) detecting a situation further includes (a)(ii) detecting an error during a data read operation, and (a)(iii) attempting one or more data-recovery operations to correct the detected error, and thereafter performing the head-instability-recovery operation of (b) if at least one of the one or more data-recovery operations fails to correct the detected error.

Yet another aspect of the present invention provides a disc drive system 100 that includes a base plate 112, a rotatable disc 134 mounted to the base plate 112, and an actuator 120. The actuator includes a magneto-resistive (MR) transducer 210 mounted to the actuator in transducing relation to the disc 134. The system 100 also includes means as described herein, operably coupled to the MR transducer 210, for recovering from instability of the MR transducer 210.

It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A disc-drive system comprising:
   a disc case;
   a disc rotatably mounted within the disc case;
   an actuator assembly mounted within the disc case, the actuator assembly having a magneto-resistive (MR) transducer head operatively disposed in a data reading and a data writing relationship with the disc;
   an adjustable current source; and
   a controller responsive to a head instability condition associated with errors detected in the data reading relationship in switching the current source from a nominal bias current to a burst current greater than the nominal bias current in recovering the head from the instability condition.

2. The disc-drive system of claim 1, wherein the current source supplies a burst current that is about 3 milliamps above the nominal bias current.

3. The disc-drive system of claim 1, wherein the current source supplies a burst current of about 100 microseconds and a current that is above the nominal bias current.

4. The disc-drive system of claim 1, wherein the current source supplies a burst current of about 100 microseconds and a current that is about 3 milliamps above the nominal current.

5. The disc-drive system of claim 1, further comprising:
   a data-recovery circuit that operates to attempt to correct the detected data read error, and thereafter indicates to the controller to supply the burst current if at least one of the data-recovery circuit fails to correct the detected data read error.

6. The disc-drive system of claim 1, further comprising:
   an information-handling system operatively coupled to at least read data from the disc, the information-handling system further comprising:
      one or more data processors;
      one or more memories operatively coupled to each one of the one or more data processors; and
      at least one input/output system coupled to at least one of the one or more data processors to receive input data and to supply output data.

7. A head-instability-recovery circuit to recover from a head-instability condition of a magneto-resistive (MR) transducer head, the circuit comprising:
   an adjustable current source; and
   a controller responsive to a head instability condition associated with errors detected in the data reading relationship in switching the current source from a nominal bias current to a burst current greater than the nominal bias current in recovering the head from the instability condition.

8. The head-instability-recovery circuit of claim 7, wherein the current source supplies a burst current that is about 3 milliamps above the nominal bias current.

9. The head-instability-recovery circuit of claim 7, wherein the current source supplies a burst current of about 100 microseconds and a current that is above the nominal bias current.

10. The head-instability-recovery circuit of claim 7, wherein the current source supplies a burst current of about 100 microseconds and a current that is about 3 milliamps above the nominal bias current.

11. The head-instability-recovery circuit of claim 7, wherein the controller controls the current source to supply the burst current during a startup condition.

12. The head-instability-recovery circuit of claim 7, further comprising:
    a data-recovery circuit that operates to attempt to correct the detected data read error, and thereafter indicates to the controller to supply the burst current if at least one of the data-recovery circuit fails to correct the detected data read error.

13. A method for recovering from a transducer-instability condition of a magneto-resistive (MR) transducer, the method comprising the steps of:
    (a) detecting an error in a data read operation indicating a head-instability-recovery operation is desired; and
    (b) performing the head-instability-recovery operation.

14. The method according to claim 13, wherein the performing step (b) further comprises:
    (b)(i) supplying a burst current having a current above a nominal bias current associated with a data reading mode of the MR transducer.

15. The method according to claim 14, wherein the supplying step (b)(i) further comprises:
    (b)(i)(A) supplying a burst current having a current that is about 3 milliamps above the nominal bias current.

16. The method according to claim 14, wherein the supplying step (b)(i) further comprises:
    (b)(i)(B) supplying a burst current of about 100 microseconds and a current that is above the nominal bias current.

17. The method according to claim 14, wherein the supplying step (b)(i) further comprises:
    (b)(i)(C) supplying a burst current of about 100 microseconds and a current that is about 3 milliamps above the nominal bias current.

18. The method according to claim 13, wherein the detecting step (a) further comprises:
    (a)(i) detecting a startup condition.

19. The method according to claim 13, wherein the detecting step (a) further comprises:
    (i) attempting one or more data-recovery operations to correct the detected error, and thereafter performing the head-instability-recovery operation of step (b) if at least one of the one or more data-recovery operations fails to correct the detected error.

20. A disc drive data storage system comprising:
    a base plate;
    a rotatable disc mounted to the base plate;
    an actuator, the actuator including a magneto-resistive (MR) transducer mounted to the actuator in transducing relation to the disc; and
    means, operably coupled to the MR transducer, for recovering from instability of the MR transducer by triggering a burst current above a nominal bias current associated with the transducing relation in response to detecting a transducing relation error.

* * * * *